United States Patent
Osborg et al.

(10) Patent No.: US 8,952,255 B2
(45) Date of Patent: Feb. 10, 2015

(54) SUBSEA PIPELINE DIRECT ELECTRIC HEATING CABLE WITH A PROTECTION SYSTEM

(75) Inventors: Per Arne Osborg, Asker (NO); Hans Kvarme, As (NO)

(73) Assignee: Nexans, Paris (FR)

( * ) Notice: Subject to any disclaimer, the term of this patent is extended or adjusted under 35 U.S.C. 154(b) by 131 days.

(21) Appl. No.: 13/429,672

(22) Filed: Mar. 26, 2012

(65) Prior Publication Data

US 2012/0267165 A1    Oct. 25, 2012

(30) Foreign Application Priority Data

Apr. 19, 2011   (NO) .................................... 20110612

(51) Int. Cl.
| | | |
|---|---|---|
| *H01B 1/00* | (2006.01) | |
| *H01B 7/14* | (2006.01) | |
| *H05B 3/56* | (2006.01) | |
| *F16L 53/00* | (2006.01) | |
| *H01B 7/04* | (2006.01) | |

(52) U.S. Cl.
CPC ................ *H05B 3/56* (2013.01); *F16L 53/007* (2013.01); *H01B 7/045* (2013.01); *H05B 2214/02* (2013.01); *H05B 2214/03* (2013.01)
USPC ................ 174/70 R; 174/102 C; 174/102 SC

(58) Field of Classification Search
CPC ............ H01B 7/04; H01B 7/14; H01B 7/045; H01B 7/046; F16L 53/007; F16L 53/00; H05B 3/56
USPC ...... 174/68.1, 68.3, 70 R, 102 R, 105 R, 107, 174/102 C, 102 SC, 110 R, 113 C, 120 R, 174/120 SC, 110 PM, 106 SC
See application file for complete search history.

(56) References Cited

U.S. PATENT DOCUMENTS

| | | | | |
|---|---|---|---|---|
| 3,604,461 | A * | 9/1971 | Matthews ..................... | 138/137 |
| 3,634,607 | A * | 1/1972 | Coleman ................... | 174/120 R |
| 4,225,749 | A * | 9/1980 | Pierre et al. .................. | 174/107 |
| 4,317,000 | A * | 2/1982 | Ferer .......................... | 174/70 R |
| 6,417,457 | B1 * | 7/2002 | Aasbo et al. .............. | 174/120 R |
| 7,285,726 | B2 * | 10/2007 | Bremnes .................. | 174/102 R |
| 7,381,900 | B2 * | 6/2008 | Bremnes et al. .......... | 174/102 R |

FOREIGN PATENT DOCUMENTS

WO        2007096775        8/2007

OTHER PUBLICATIONS

International Search Report dated Nov. 17, 2011.

* cited by examiner

*Primary Examiner* — Angel R Estrada
*Assistant Examiner* — Dimary Lopez Cruz
(74) *Attorney, Agent, or Firm* — Sofer & Haroun, LLP

(57) ABSTRACT

A piggyback cable (10) has a copper conductor (2) with a triple extruded insulation system including a conductor screen (13), an insulation layer (14), and an insulation screen (15), an inner sheath (16) surrounding this insulation system, and an outer sheath (18), the space between the inner (16) and outer (18) sheaths being filled with protective elements. The protective elements have thermoplastic (21) elements arranged together to form at least one layer helically wound around the said cable (10).

6 Claims, 1 Drawing Sheet

SUBSEA PIPELINE DIRECT ELECTRIC HEATING CABLE WITH A PROTECTION SYSTEM

RELATED APPLICATION

This application claims the benefit of priority from Norwegian Patent Application No. 2011 0612, filed on Apr. 19, 2011, the entirety of which is incorporated by reference.

BACKGROUND

1. Field of the Invention

The present invention relates to a subsea pipeline direct electric heating (DEH) cable, so called "piggyback" cable.

2. Description of the Related Art

For heating of oil or gas pipelines in order to prevent hydrate and ice formation on the pipeline walls, a common practice consists in developing a direct heating system based on a current supply cable which is traditionally made simultaneously with the laying of the pipeline. In a general way a piggyback cable is strapped to the pipeline during installation thereof.

Piggyback cables are well known and have been already disclosed in patents. For instance, referring to FIG. 1, which is a cross section view of a piggyback cable described in WO2007096775, a piggyback cable 1 comprises a copper conductor 2 with a standard triple extruded insulation system: conductor screen 3 (semi-conductive), cross-linked polyethylene insulation 4, and insulation screen (semi-conductive) 5. A steel tube 6 which is containing optical fibers is performed into a sinus shape in order to achieve required bending properties, and is placed onto the insulation screen 5. One or more semi-conductive sheath(s) 7 is (are) extruded over this assembly.

Some of the piggyback cables disclosed in prior art documents, may also have a protective system to take up limited either radial or axial loads, or may have a limited resistance to impact and crush loads with a large outer diameter.

OBJECTS AND SUMMARY

The piggyback cables according to the present invention include a protective system which takes up both axial and radial loads, without having a large outer diameter. The reduced outer diameter will give reduced transportation costs and also enable longer lengths to be transported.

More specifically the invention relates to a piggyback cable comprising a copper conductor with a standard triple extruded insulation system constituted by a conductor screen, an insulation layer, and an insulation screen, an inner sheath surrounding this insulation system, and an outer sheath, the space between the inner and outer sheaths being filed with protective elements. The main technical feature of a piggyback cable according to the invention is that the protective elements comprise thermoplastic elements arranged together to form at least one layer helically wound around the piggyback cable. With such thermoplastic layers helically wound around the piggyback cable, the protection system can take up both axial and radial loads without increasing the outer diameter of the cable. A helical arrangement is particularly suitable to give a satisfactory level of protection in regard with radial and axial loads, so that the cable keeps its original function without being damaged. Moreover a helical arrangement is also appropriate to do not take too much place around the cable, and to do not make necessary to increase the cable outer diameter.

Advantageously, the piggyback cable according to the invention, comprise a plurality of thermoplastic layers helically wound around the said cable, in order to improve its resistance to radial and axial loads.

Preferentially, the protective elements comprise reinforced semi-conductive thermoplastic elements arranged with the thermoplastic elements to form at least one layer helically wound around the piggyback cable. With such configuration of cable involving a protection system with reinforced semi-conductive thermoplastic elements, the said protection system takes up both radial and axial loads in addition to make a conductive path so that the cable can be electrical tested and verified before installation. The protection system ensures two functions which are to mechanically protect the cable and to permit to drain the charging current. For a cable comprising a plurality of thermoplastic layers, each of said layers also contains reinforced semi-conductive elements to form a plurality of layers helically wound around the cable.

Advantageously, the sheaths are semi-conductive. As the reinforced elements contained into the protection system, the sheaths are also semi-conductive so that the conductive path is established. The semi-conductive material of the sheath is the same of this of the reinforced thermoplastic layers, so that the piggyback cable is easier and faster to be manufactured.

Preferentially, the inner sheath comprises a fiber optical element. This fiber optical element extends along the cable and is used to detect a fault condition inducing effects or damages to cable section.

Advantageously, the ratio between the number of reinforced semi-conductive thermoplastic elements and the total number of the elements comprising both thermoplastic and reinforced semi-conductive thermoplastic elements is comprised between 5% and 50%. Such a ratio is indeed variable depending on the requirement of either tensile strength or conductivity. For a cable comprising a plurality of protective layers, the ratio remains constant from one layer to another.

In another preferred embodiment of the cable according to the invention, inner and outer sheaths are in polyethylene.

One of the great advantages of a piggyback cable according to the invention is that they include a not very cumbersome protection system which is able to ensure two functions, one consisting in taking up both radial and axial loads, and the other consisting in draining charging current during electrical testing before installation.

BRIEF DESCRIPTION OF THE DRAWINGS

A detailed description of one preferred embodiment of a piggyback cable according to the invention is given referring to FIGS. 1 to 2.

DETAILED DESCRIPTION

Figure 1:
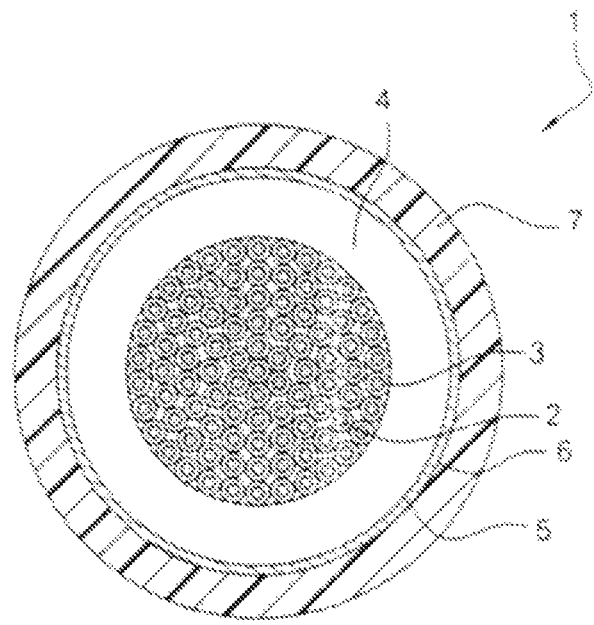
FIG. 1 is a cross section view of a prior art piggyback cable, already disclosed.
Figure 2:
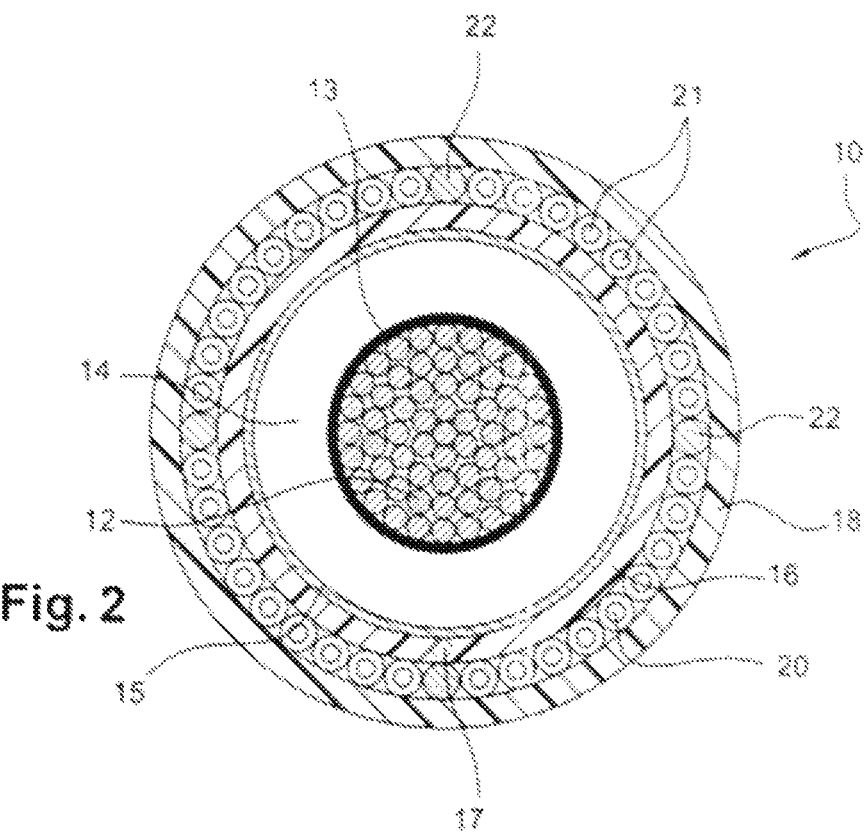
FIG. 2 is a cross section view of a piggyback cable according to the invention.

As shown in FIG. 2 a piggyback cable 10 according to the invention, comprises a copper conductor 12 with a standard, triple extruded insulation system: conductor screen 13 (semi-conductive), cross-linked polyethylene insulation 14, and insulation screen 15 (semi-conductive). The said standard triple extruded insulation system is surrounded by an inner sheath 16 in polyethylene and comprising at least one fiber optical element 17 which extends along the cable 10 and which is used to detect condition fault inducing effects or damages to cable section. The cable 10 also comprises an outer sheath 18 in polyethylene which is placed around the inner sheath 16, and the free space between these two sheaths 16, 17 is filled with a plurality of protective elements 20 resulting from a combination of thermoplastic 21 and reinforced semi-conductive thermoplastic 22 elements arranged together to form a layer helically wound around the piggyback cable 10. Inner sheath 16 and outer sheath are semi-conductive. As shown in FIG. 2, the ratio between the number of reinforced semi-conductive elements 22 and the total number of the elements comprising both thermoplastic 21 and reinforced semi-conductive thermoplastic elements 22 is for instance equal to 10%. In a general way, this ratio may vary between 5% and 50%, depending on the conductivity and/or the expected radial and axial loads. A protection system involving such thermoplastic 21 and reinforced semi-conductive thermoplastic elements 22 arranged together to form a layer helically wound around the cable 10, is compact and does not increase the outer diameter of the said cable 10. The piggyback cable 10 according to the invention includes a compact and efficient protection system which can improve its resistance to axial and radial loads and which can drain charging current during electrical testing before installation.

The invention claimed is:

1. Piggyback cable comprising:
   a copper conductor with a triple extruded insulation system including:
   a conductor screen;
   an insulation layer;
   an insulation screen;
   an inner sheath surrounding this insulation system; and
   an outer sheath, the space between the inner and outer sheaths being filled with protective elements,
   wherein the protective elements include a plurality of thermoplastic protective elements and a plurality of reinforced semi-conductive thermoplastic elements in a certain ratio arranged together to form at least one layer helically wound around the said cable, wherein each of said reinforced semi-conductive thermoplastic element has a homogeneous composition which is completely semi-conductive, and said thermoplastic protective elements and said reinforced semi-conductive thermoplastic elements being separate and independent from each other.

2. Piggyback cable according to claim 1, wherein said piggyback cable comprises a plurality of thermoplastic layers helically wound around the said cable.

3. Piggyback cable according to claim 1, wherein the sheaths are semi-conductive.

4. Piggyback cable according to claim 3, wherein the ratio between the number of reinforced semi-conductive thermoplastic elements and the total number of the elements comprising both thermoplastic and reinforced semi-conductive thermoplastic elements is comprised between 5% and 50%.

5. Piggyback cable according to claim 1, wherein the inner sheath comprises a fiber optical element.

6. Piggyback cable according to claim 1, wherein inner and outer sheaths are in polyethylene.

\* \* \* \* \*